US010051229B2

(12) United States Patent
Pickens

(10) Patent No.: US 10,051,229 B2
(45) Date of Patent: Aug. 14, 2018

(54) TELEVISION PROTECTION AND CARRYING DEVICE

(71) Applicant: David Theron Pickens, Fort Mill, SC (US)

(72) Inventor: David Theron Pickens, Fort Mill, SC (US)

(73) Assignee: P2 Ops LLC, Fort Mill, SC (US)

( * ) Notice: Subject to any disclaimer, the term of this patent is extended or adjusted under 35 U.S.C. 154(b) by 0 days.

(21) Appl. No.: 15/383,663

(22) Filed: Dec. 19, 2016

(65) Prior Publication Data

US 2017/0099451 A1 Apr. 6, 2017

Related U.S. Application Data

(63) Continuation-in-part of application No. 15/062,739, filed on Mar. 7, 2016, now Pat. No. 9,854,197.

(60) Provisional application No. 62/130,933, filed on Mar. 10, 2015.

(51) Int. Cl.
*H04N 5/64* (2006.01)
*F16M 13/00* (2006.01)

(52) U.S. Cl.
CPC .............. *H04N 5/64* (2013.01); *F16M 13/00* (2013.01)

(58) Field of Classification Search
CPC ..... F16M 13/00; A45C 2011/003; A45C 9/00; H04N 5/64
USPC ....................................... 248/688; 361/679.59
See application file for complete search history.

(56) References Cited

U.S. PATENT DOCUMENTS

| | | | | |
|---|---|---|---|---|
| 1,461,656 A * | 7/1923 | Harned | ................ | B65D 5/5206 206/45.23 |
| 2,107,991 A | 2/1938 | Thomas | | |
| 2,113,245 A | 4/1938 | Thomas | | |
| 2,660,294 A | 11/1953 | Lewis | | |
| 4,258,833 A | 3/1981 | Simms | | |
| 5,035,393 A * | 7/1991 | Menaged | ............ | A47B 23/043 248/456 |
| 5,100,098 A * | 3/1992 | Hawkins | ............. | F16M 11/041 16/339 |
| 6,282,082 B1 | 8/2001 | Armitage et al. | | |
| 6,842,337 B2 * | 1/2005 | Helot | ..................... | A47B 91/02 312/223.2 |
| 7,775,356 B2 * | 8/2010 | Palmer | ..................... | A45C 5/03 206/320 |
| 8,201,687 B2 * | 6/2012 | Zeliff | .................... | G06F 1/1626 206/320 |
| 9,143,181 B1 * | 9/2015 | Jia | ........................ | H04B 1/3888 |
| 9,715,248 B2 | 7/2017 | Wu et al. | | |
| 2003/0089832 A1 | 5/2003 | Gold | | |
| 2009/0179132 A1 * | 7/2009 | Qin | ..................... | A47B 23/043 248/371 |

(Continued)

*Primary Examiner* — Adam Waggenspack
(74) *Attorney, Agent, or Firm* — Seth L. Hudson; Clements Bernard Walker, PLLC

(57) ABSTRACT

The present invention provides methods and systems for a television protection and carrying device that includes a top portion with a base portion, a first end, a second end, and two sides. A bottom portion with a first end, a second end and two sides, and a support device pivotally connected to the top portion having a first position and a second position, wherein the first position the support device is adjacent the top portion and in the second position is spaced-apart from the top portion for positioning the top portion in the vertical position.

17 Claims, 17 Drawing Sheets

(56) References Cited

U.S. PATENT DOCUMENTS

2010/0320349 A1 12/2010 Necessary
2011/0203955 A1 8/2011 Elaine

* cited by examiner

TELEVISION PROTECTION AND CARRYING DEVICE

CROSS REFERENCE TO RELATED PATENT APPLICATION

The present patent application/patent is a continuation-in-part of U.S. patent application Ser. No. 15/062,739 filed on Mar. 7, 2016 titled "TELEVISION PROTECTION AND CARRYING DEVICE", which claims the benefit of the earlier priority filing of U.S. Provisional Patent Application No. 62/130,933, filed on Mar. 10, 2015, and entitled "TELEVISION PROTECTION AND CARRYING DEVICE," the contents of which are incorporated in full by reference herein.

FIELD OF THE INVENTION

The present invention relates generally to a television protection and carrying device, and more generally relates to a television protection and carrying device that also serves as a carrier and stand to easily transport and use plasma, LED, and LCD televisions during camping, tailgating, and the like.

BACKGROUND OF THE INVENTION

New lightweight televisions, such as plasma, LED, and LCD television sets, are easily transportable and have many recreational uses as compared to their antiquated cousins utilizing a cathode ray tube. These new lightweight televisions are increasingly being taken outside the confines of a residence for use in the garage during outdoor camping, outside of the home recreational activities, gaming, tailgating, and the like.

Storing and transporting these televisions for recreational activities increases the risk for damage to the screen facing or structural components. Therefore, there is a need for a protective carrier and storage device for the television. Additionally, there is a need for a stand engaged to the protective carrier to obviate the need to completely remove the television from the protective carrier, possibly resulting in damage to the television, while allowing uninhibited viewing and use.

BRIEF SUMMARY OF THE INVENTION

According to an embodiment of the present invention, the television protection and carrying device includes a top portion with a base portion, a first end, a second end, and two sides, a bottom portion with a first end, a second end and two sides. A receptacle is disposed within each side of the bottom portion for receiving the second end of the top portion for selectively securing the top portion to the bottom portion.

According to yet another embodiment of the present invention, the television protection and carrying device includes a sun shield portion rotatably connected to the top portion.

According to yet another embodiment of the present invention, the television protection and carrying device includes a television positioned within the base portion of the top portion.

According to yet another embodiment of the present invention, the television protection and carrying device includes a strap positioned on the first bar and second bar and spanning between the first bar and second bar.

According to yet another embodiment of the present invention, the television protection and carrying device includes a strap for carrying the device.

According to yet another embodiment of the present invention, the television protection and carrying device includes a first locking mechanism on the top portion and a second locking mechanism on the bottom portion, wherein the first locking mechanism and second locking mechanism are selectively secured to one another.

According to yet another embodiment of the present invention, the television protection and carrying device includes a plate positioned within the top portion.

According to yet another embodiment of the present invention, the television protection and carrying device includes a first positioning bar and the second positioning bar engaged to the top portion and at least one connecting bar spanning between the first positioning bar and the second positioning bar.

According to yet another embodiment of the present invention, the television protection and carrying device includes two thumbscrews rotationally disposed on the first bar and two thumbscrews rotationally disposed on the second bar.

According to yet another embodiment of the present invention, the television protection and carrying device includes a cushioning element disposed on the bottom portion.

According to yet another embodiment of the present invention, the television protection and carrying device includes a pair of support rods.

According to yet another embodiment of the present invention, the television protection and carrying device includes a top portion with a base portion, a first end, a second end, and two sides, and a bottom portion with a first end, a second end and two sides. The television is positioned within the base portion of the top portion and the bottom portion may be placed adjacent the television and in a selectively secured arrangement with the top portion.

According to yet another embodiment of the present invention, the television protection and carrying device includes a retention device disposed on the top portion for securing the top portion to a surface, such as a wall or the like.

According to yet another embodiment of the present invention, the television protection and carrying device includes a receptacle disposed within each side of the bottom portion for receiving the second end of the top portion for selectively securing the top portion to the bottom portion.

According to yet another embodiment of the present invention, the television protection and carrying device includes a top portion with a base portion, a first end, a second end, and two sides, and a bottom portion with a first end, a second end and two sides. A retention device is disposed within the top portion for selectively securing a television within the device.

BRIEF DESCRIPTION OF THE DRAWINGS

The present invention is illustrated and described herein with reference to the various drawings, in which like reference numbers denote like method steps and/or system components, respectively, and in which.

DETAILED DESCRIPTION OF THE INVENTION

The present invention may be understood more readily by reference to the following detailed description of the invention taken in connection with the accompanying drawing figures, which form a part of this disclosure. It is to be understood that this invention is not limited to the specific devices, methods, conditions or parameters described and/or shown herein, and that the terminology used herein is for the purpose of describing particular embodiments by way of example only and is not intended to be limiting of the claimed invention. Any and all patents and other publications identified in this specification are incorporated by reference as though fully set forth herein.

Also, as used in the specification including the appended claims, the singular forms "a," "an," and "the" include the plural, and reference to a particular numerical value includes at least that particular value, unless the context clearly dictates otherwise. Ranges may be expressed herein as from "about" or "approximately" one particular value and/or to "about" or "approximately" another particular value. When such a range is expressed, another embodiment includes from the one particular value and/or to the other particular value. Similarly, when values are expressed as approximations, by use of the antecedent "about," it will be understood that the particular value forms another embodiment.

Figure 1:
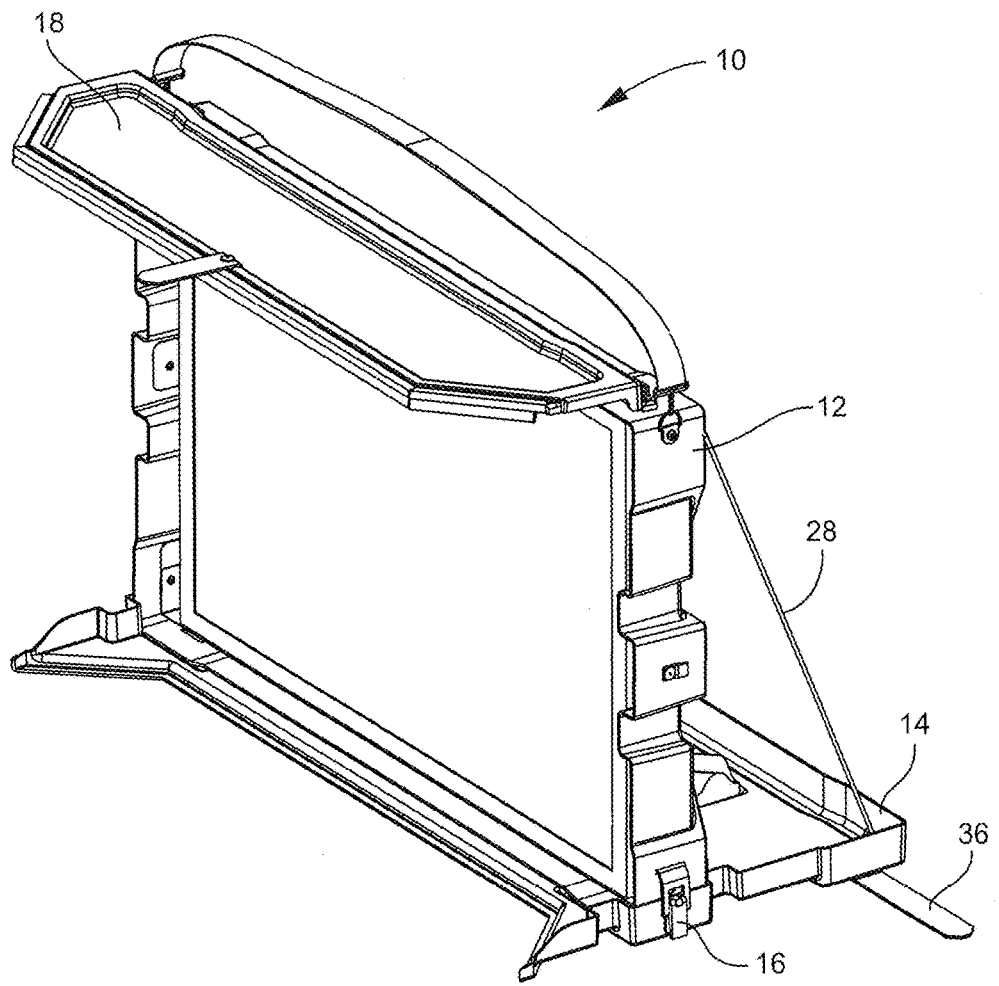
FIG. 1 is a perspective view of the present invention.
Figure 2:
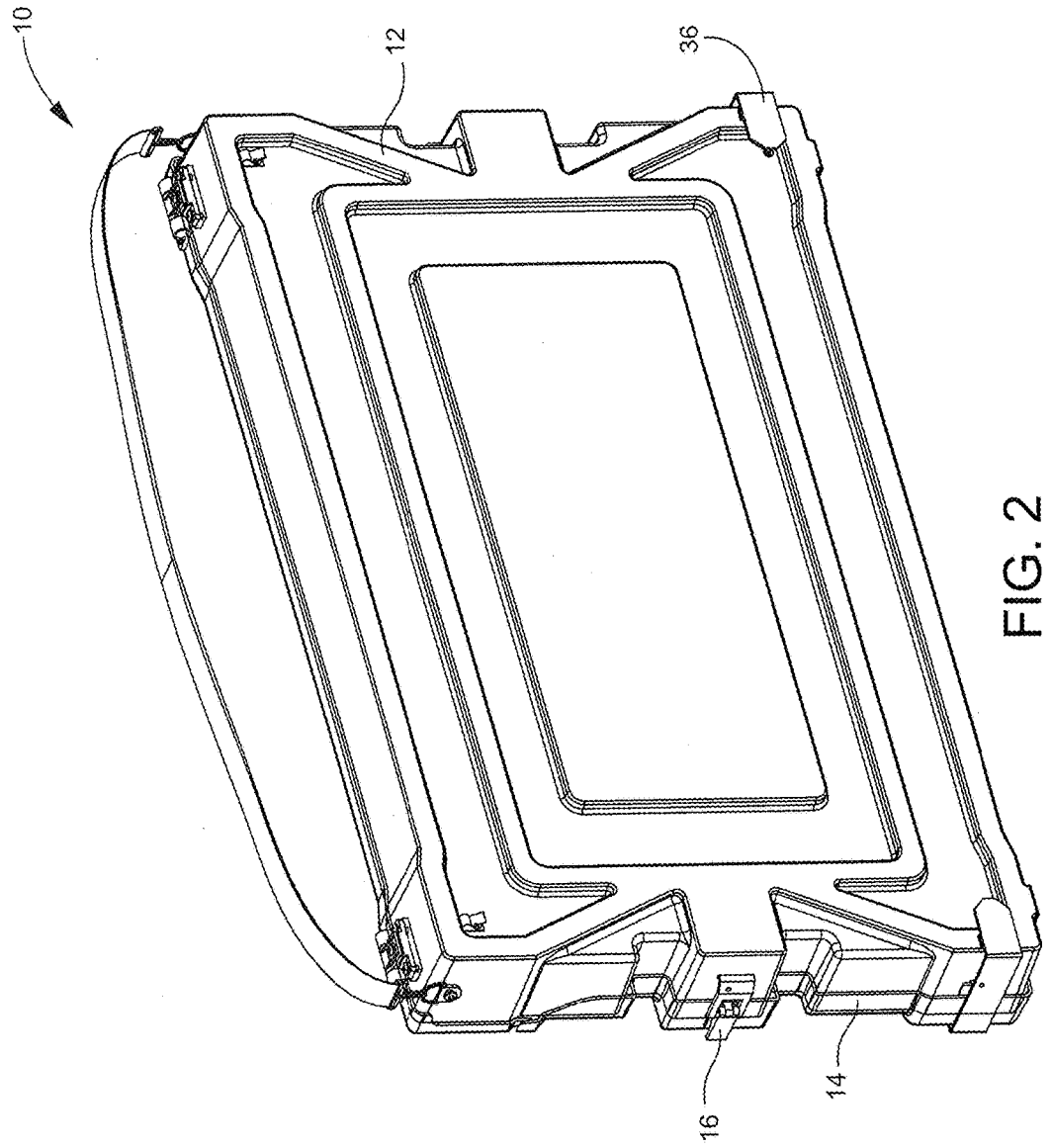
FIG. 2 is a perspective front-view of the present invention.
Figure 3:
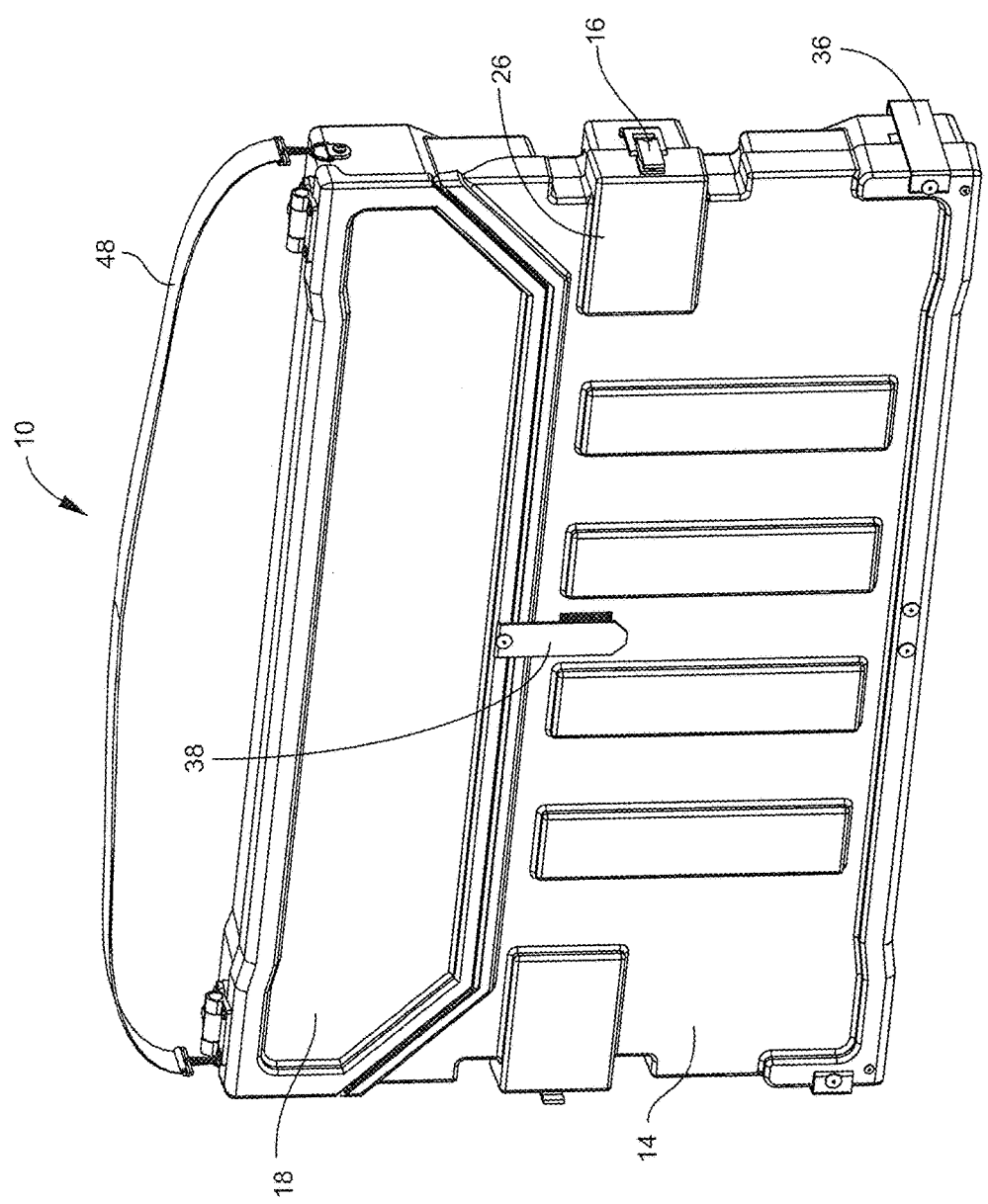
FIG. 3 is a perspective back-view of the present invention.
Figure 4:
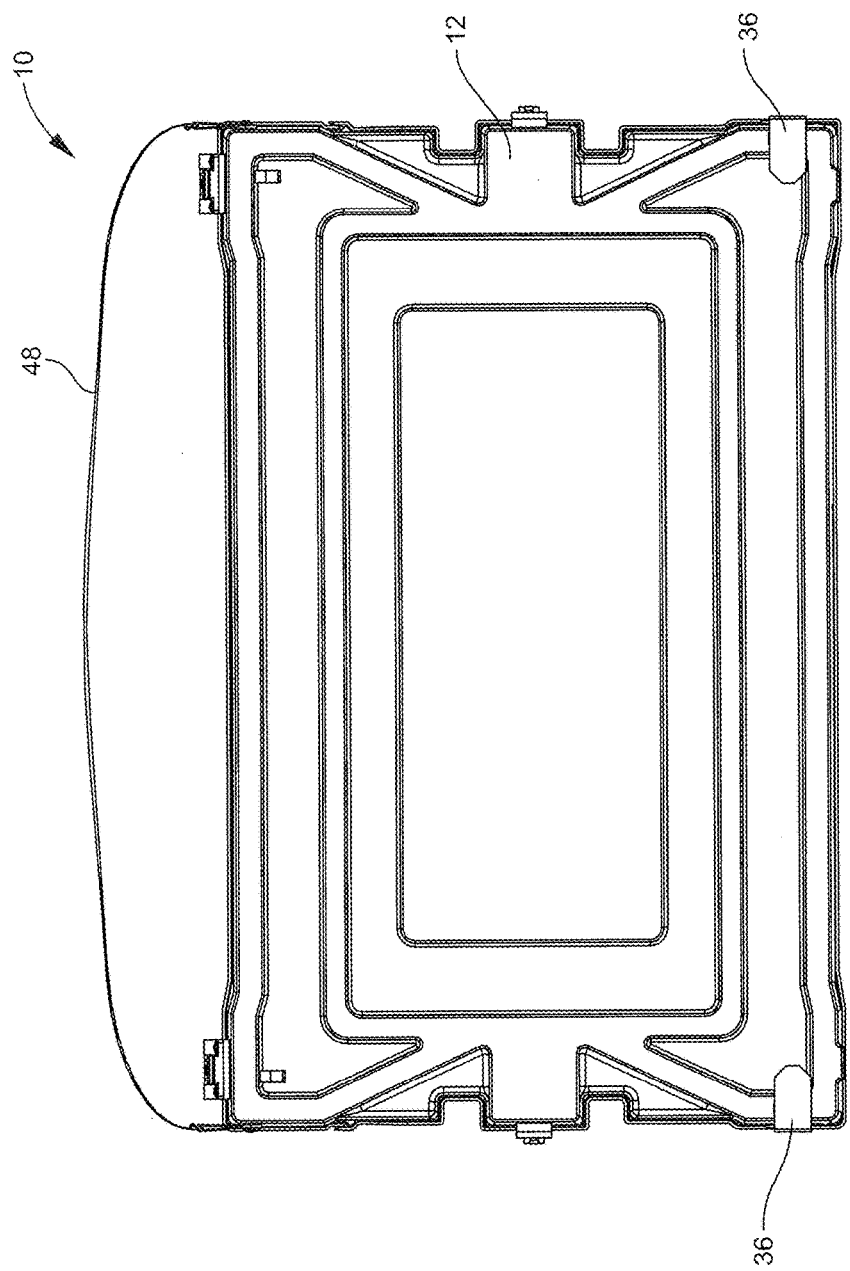
FIG. 4 is a front view of the present invention.

Referring now specifically to the drawings, a television protection and carrying device is illustrated in FIG. 1 and is shown generally at reference numeral 10. As illustrated, the device 10 contains a top portion 12 and a bottom portion 14. The top portion 12 includes a base portion, a first end, a second end, and two spaced-apart sides.

The bottom portion 14 includes a first end, a second end, two-spaced apart sides, a first side, and a second side.

The device 10 has an open position and a closed position. The open position is illustrated in FIGS. 1, 5, 6, and 8. The closed position is illustrated in FIGS. 2, 3, 4, and 7. In the open position, the top portion 12 and bottom portion 14 are selectively secured to one another with the sides of the top portion 12 and bottom portion 14 disposed adjacent each other. The top portion 12 and bottom portion 14 may be selectively secured to one another by the use of a lock 16 or similar device.

Figure 6:
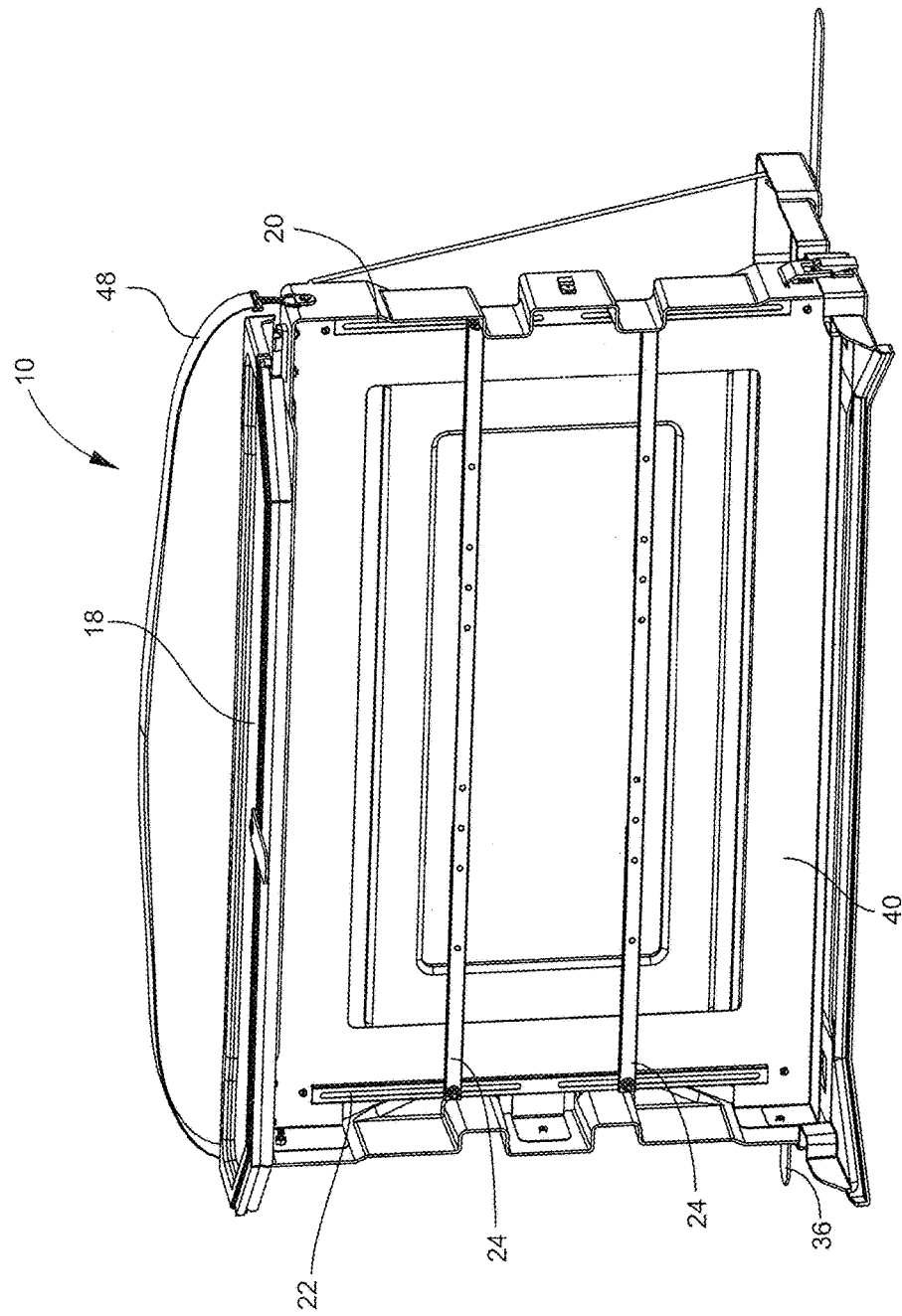
FIG. 6 is a front view of the present invention.
Figure 7:
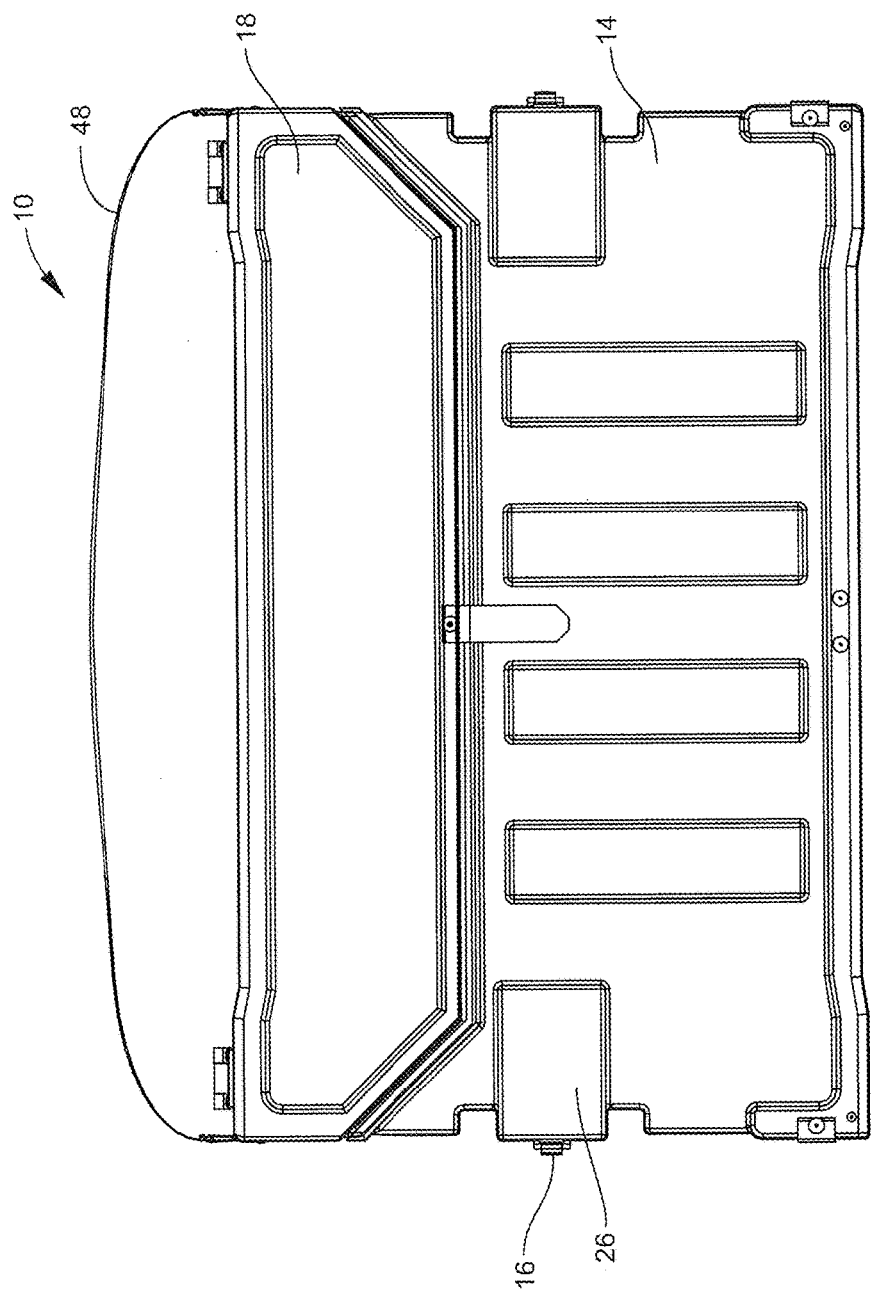
FIG. 7 is a back view of the present invention.

An optional sun shield portion 18 may be rotatably engaged to the top portion 12. The sun shield portion 18 is rotatably connected to the first end of the top portion 12, preferably by the use of a hinge. Alternatively, the sun shield portion 18 may be engaged to the top portion 12 by other means. The top portion 12 is designed to house a television, which is disposed within the base portion and within the first end, second end, and two sides of the top portion 12. The television is retained within the top portion 12 by a retention device, as shown in FIG. 6. The retention device consists of a first positioning bar 20 and a second positioning bar 22. At least one slot is disposed along the length of the first positioning bar 20 and the second positioning bar 22. At least one connecting bar 24 is either selectively secured or engaged to the first positioning bar 20 and the second positioning bar 22. The at least one connecting bar 24 has a first end and a second end, wherein the first end is selectively secured or engaged to the first positioning bar 20 and the second end is selectively secured or engaged to the second positioning bar 22.

As illustrated in FIG. 6, the device 10 contains two connecting bars 24 positioned in a spaced-apart relationship to one another. The connecting bars 24 contain a plurality of holes, including a hole on the first end and second end, which are designed to fit overtop the slots of the first positioning bar 20 and second positioning bar 22 for receiving a retention means there through. The television is releasably secured to the retention device.

The bottom portion 14 contains at least one receptacle 26 for receiving a portion of the top portion 12 when in the open position. The receptacle 26 may be an extension of the bottom portion 14. The receptacle 26 is designed to receive the second end of the top portion 12. A pair of support rods 28 are disposed within the second side of the bottom portion 14. The support rods 28 are rotationally connected to second side of the bottom portion 14 by use of a retention means, such as a clip or the like. The support rods are stored in the horizontal position when the device is in the closed position. The support rods 28 are rotated vertically when the device 10 is in the open position. The support rods 28 engage the back portion of the top portion 12 for providing stability to the top portion 12 when in the open position.

Figure 9:
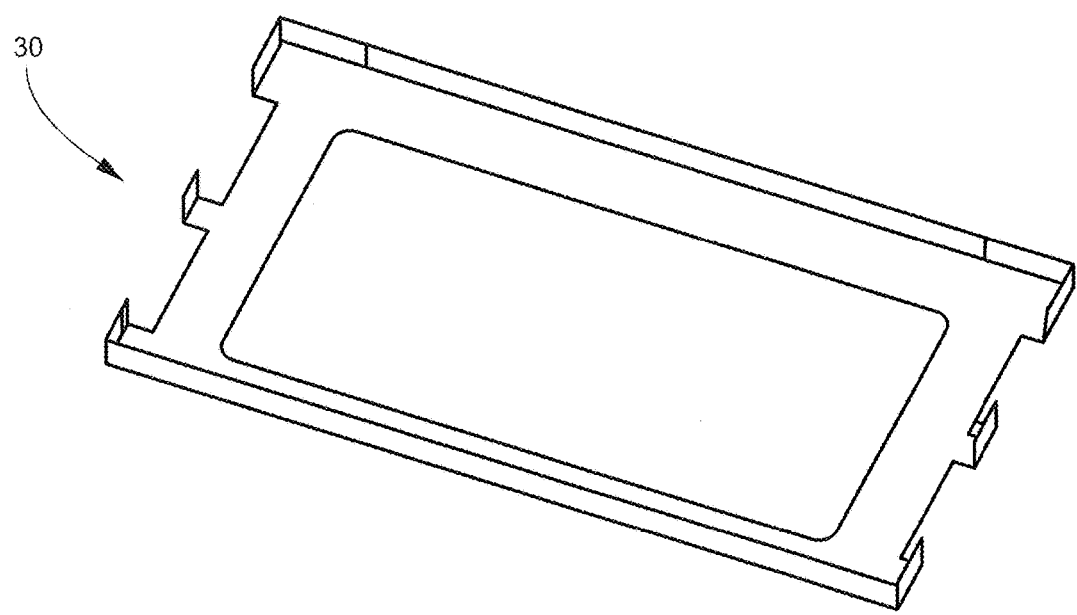
FIG. 9 is a perspective view of a plate that may optionally be positioned within the top portion of the present invention.

A brace 30 is disposed adjacent the support rods 28 and preferably centrally located on the second side of the bottom portion 14. The bottom portion 14 also contains at least one channel 32 that receives at least one cushioning element 34. As illustrated in FIG. 9, the bottom portion 14 may contain four channels 32 that receive four cushioning elements 34. A pair of support elements 36 are positioned on the first side of the bottom portion 14 that provide support for the bottom portion 14 when the device 10 is in the open position. The support elements 36 may be rotationally engaged to the first side of the bottom portion 14 and having a first position and second position. When the device 10 is in the open position, the support elements 36 are extended outwardly from the device 10 to provide support. When the device 10 is in the closed position, the support elements 36 are disposed inwardly and adjacent the device 10.

In the open position, the bottom portion 14 is generally horizontal and the top portion 12 is generally vertical. The sun shield portion 18 is folded backwards and away from the television positioned in the base portion of the top portion 12. In the closed position, the sun shield portion 18 is folded downward over the television, where it is in a parallel plane with the television. The first end of the bottom portion 14 has two downwardly sloping side portions that are connected by a flat portion. The sun shield portion 18 contains a first side that is relatively flat and a second side that contains two angled side portions that correspond with the shape of the two downwardly sloping side portions of the bottom portion. A flat portion connects the two angled portions of the sun shield portion 18 that corresponds with the flat portion of the first end of the bottom portion.

In the closed position, the sun shield portion 18 may be selectively secured to the bottom portion 14 with the use of a tab 38 and a hook and loop fastener, commonly sold under the tradename Velcro®. The tab 38 is positioned on the second side of the sun shield portion 18 and contains the hook portion of the fastener. The bottom portion 14 contains the loop portion of the fastener and when engaged with the hook portion of the fastener to form a selectively secured arrangement. The second side of the sun shield portion 18 may also contain a trim piece with a generally square or rectangular bottom portion with a bottom portion and two side portions extending generally outwardly from the edges of the bottom portion. A cavity is disposed within the two side portions. A circular portion is engaged to the external side of one of the side portions. The cavity is designed to receive the outer edge of the second side of the sun shield portion 18.

A handle may be provided on the device 10 for ease of transportation. Specifically, the handle or handles may be positioned on the top portion 12 or bottom portion 14 of the device 10. The device 10 may also contain a strap for ease of carrying. The strap is selectively secured to the device 10 and may be selectively secured to brackets located on the top portion 12 and/or bottom portion 14 of the device 10. The strap may consist of a flat nylon strap with swivel snaps on the first end and the second end of the strap. The swivel snaps engage brackets located on the top portion 12 and/or bottom portion 14 of the device 10.

The device 10 and handle may be composed of any material as desired by the user. Specifically, the device 10 and handle may be composed of plastic, metal, styrenic block copolymer, a rubber, metal, wood, HPPE, ABS, or a combination thereof.

The back portion of the top portion 12 contains a hanging mechanism. The hanging mechanism allows the television and top portion 12 to alternatively be hung, mounted, or secured to a wall or the like for viewing the television.

Figure 5:
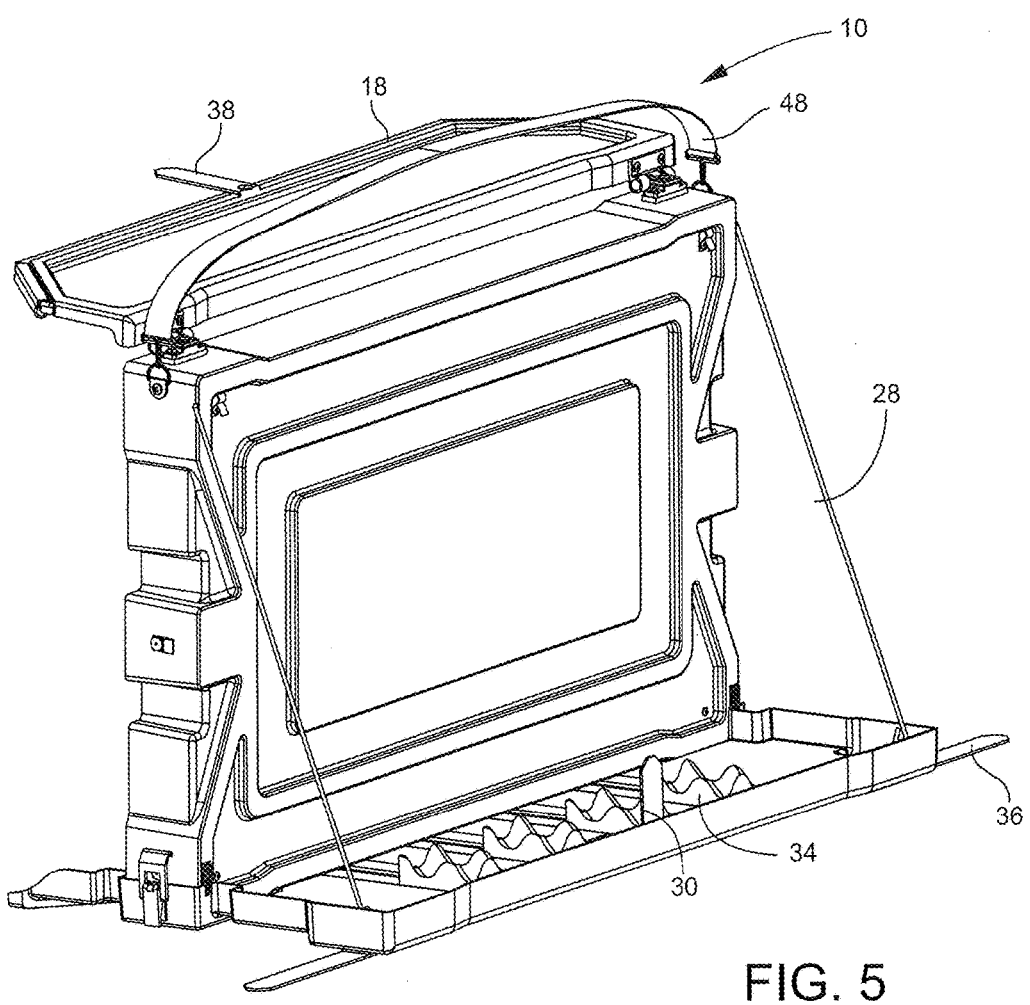
FIG. 5 is a perspective back view of the present invention.
Figure 8:
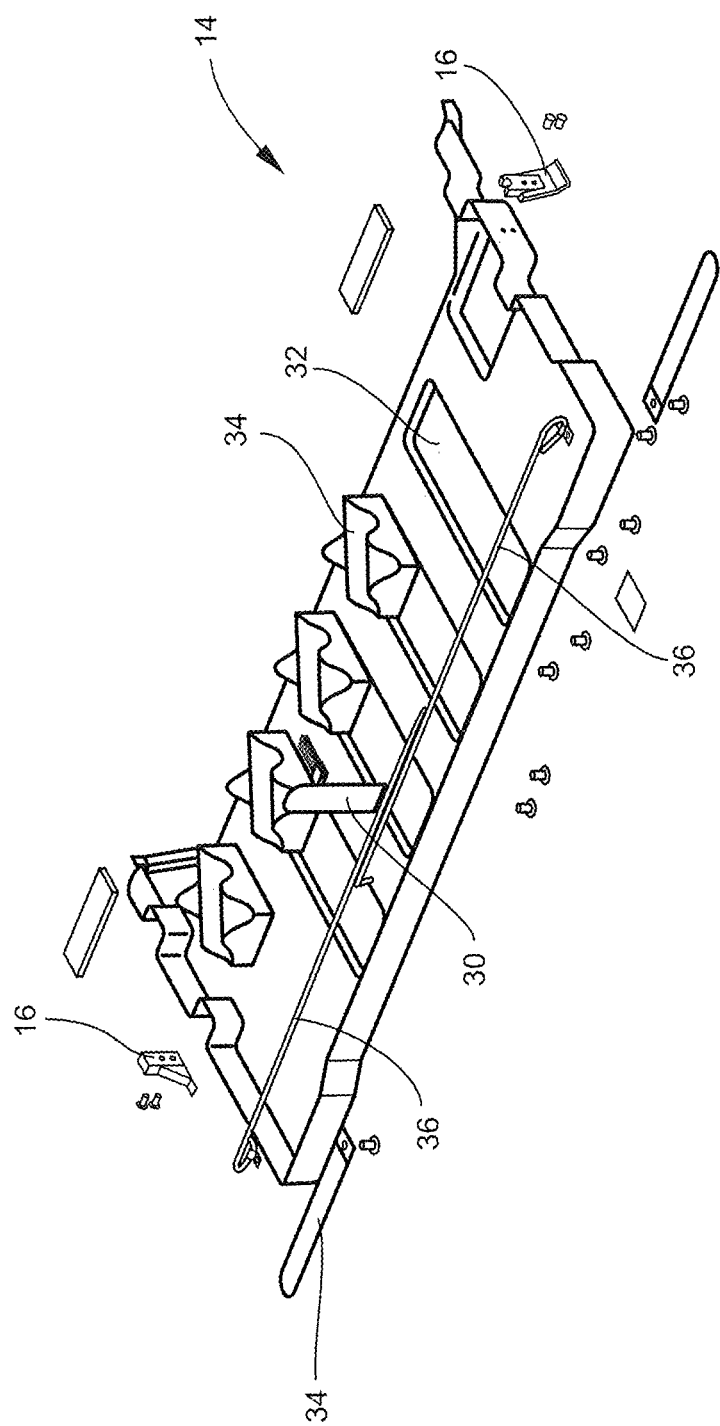
FIG. 8 is an exploded view of the bottom portion of the present invention.
Figure 10:
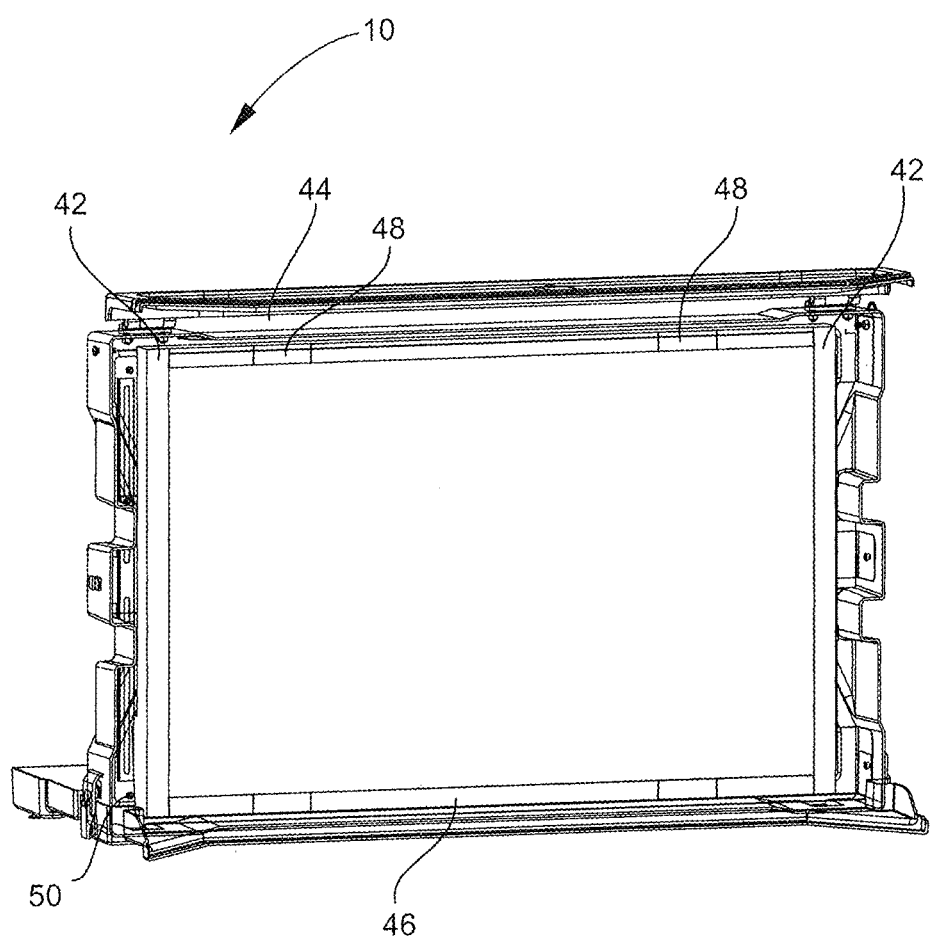
FIG. 10 is a perspective view of another alternative embodiment of the present invention.
Figure 11:
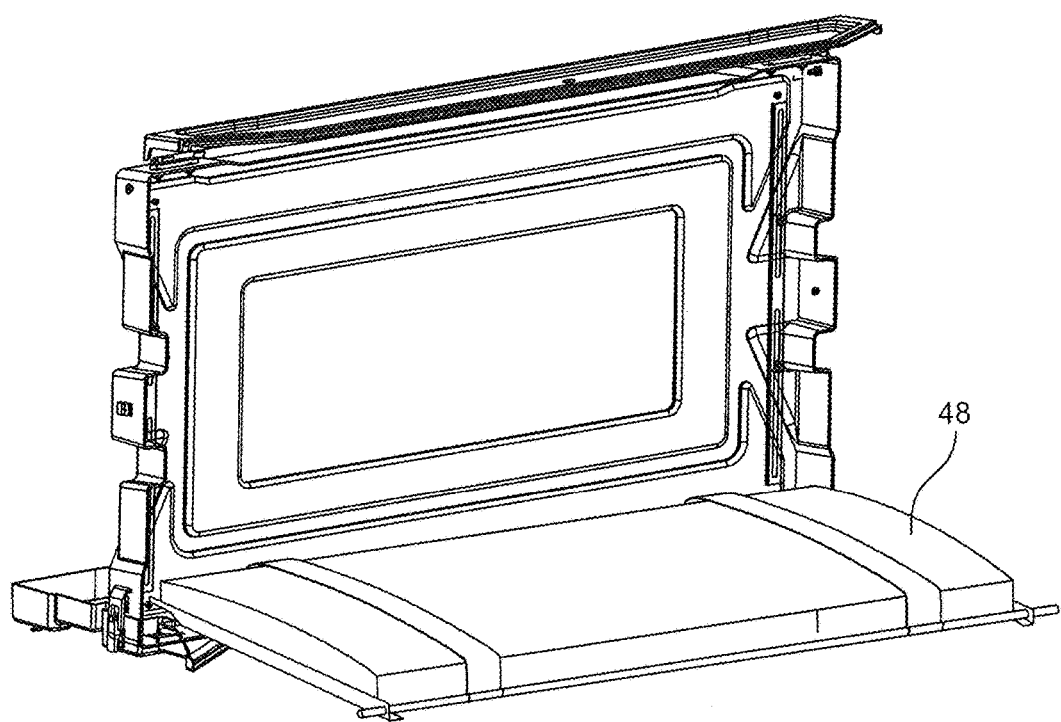
FIG. 11 is a perspective view of another alternative embodiment of the present invention.

A plate 40 may be disposed within the top portion 14 for providing added stability and reinforcement to the device 10 for mounting the television, as illustrated in FIG. 10. The plate 20 contains a base with a pair of opposed edges, and two sides that extend upwardly from a pair of edges of the base. The opposed edges partially extend at a substantially 90 degree angle into the second pair of opposed edges. A generally centrally located brace extends substantially upward from the second pair of opposed sides. The retention device may be engaged to the plate 40. The retention device consists of a first positioning bar 20 and a second positioning bar 22. At least one slot is disposed along the length of the first positioning bar 20 and the second positioning bar 22. At least one connecting bar 24 is either selectively secured or engaged to the first positioning bar 20 and the second positioning bar 22. The at least one connecting bar 24 has a first end and a second end, wherein the first end is selectively secured or engaged to the first positioning bar 20 and the second end is selectively secured or engaged to the second positioning bar 22. As illustrated in FIGS. 5 and 8, the device 10 contains two connecting bars 24 positioned in a spaced-apart relationship to one another. The connecting bars 24 contain a plurality of holes, including a hole on the first end and second end, which are designed to fit overtop the slots of the first positioning bar 20 and second positioning bar 22 for receiving a retention means there through. The television is releasably secured to the retention device.

The top portion 12 is generally rectangular in shape with a generally straight first end and second end. The two spaced-apart sides contain at least one recess. As illustrated in FIG. 1, the recesses are positioned on each side of the receptacle. The second end of the top portion 12 may contain friction devices on the external side. These friction devices provide extra traction when the top portion 12 is inserted into the receptacle of the bottom portion 14.

Figure 12:
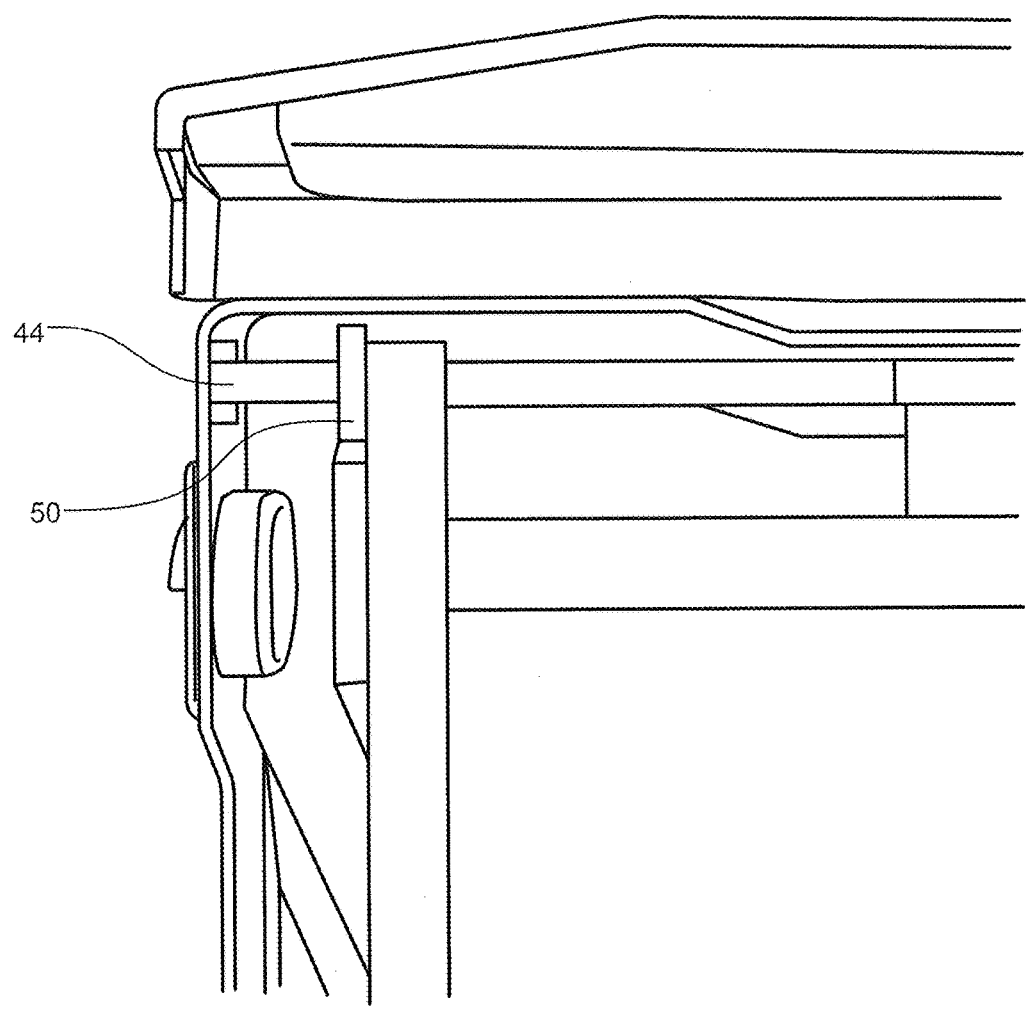
FIG. 12 is a perspective view of another alternative embodiment of the present invention.

Alternatively and as illustrated in FIGS. 10-13, the retention device consists of two side frames 42, a first bar 44, a second bar 46, and at least one strap 48. The first bar 44 and second bar 46 are engaged to the sides of the top portion 12. Two side frames 42 are disposed on either side of the first bar 44 and second bar 46. The upper portion and bottom portion of each side frame 42 contains a bore for positioning each side frame 42 on the first bar 44 and second bar 46. The first bar 44 may be unsecured from the top portion 12, allowing the television to rotate outwards and downwards on the second bar 46, as illustrated in FIG. 12.

Figure 13:
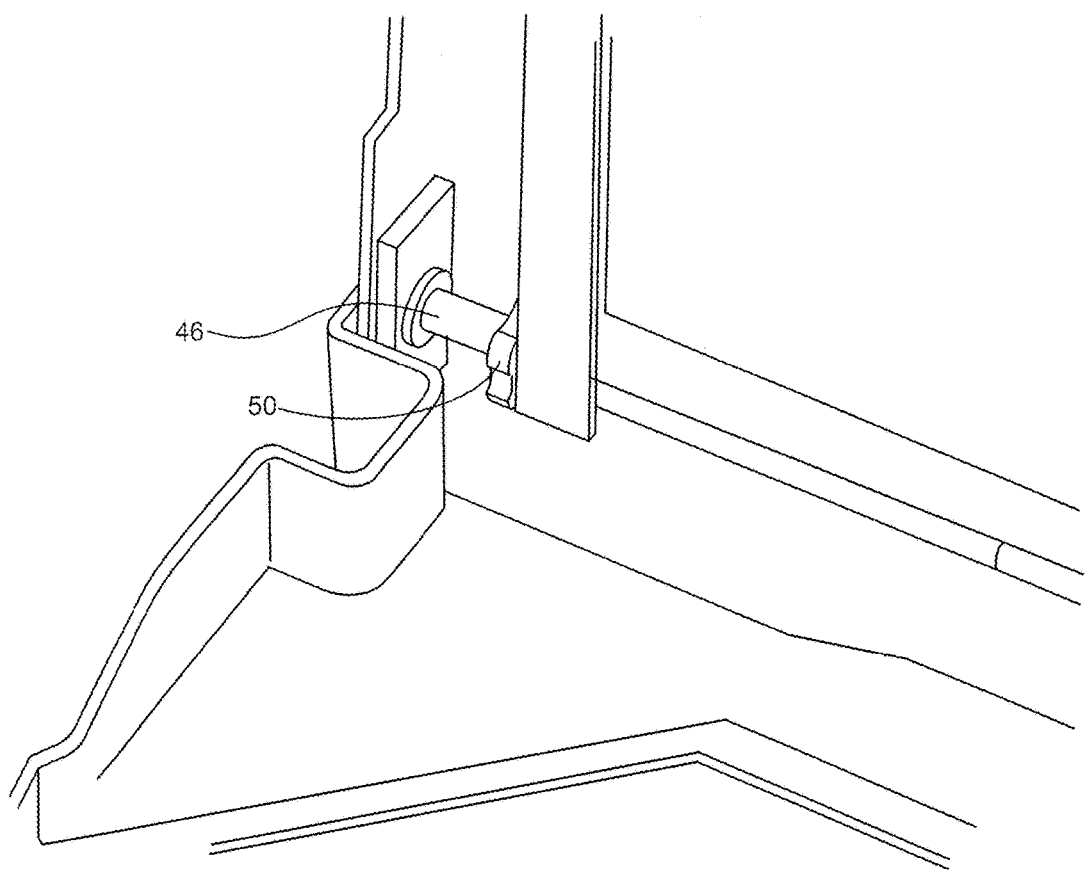
FIG. 13 is a perspective view of another alternative embodiment of the present invention.
Figure 14:
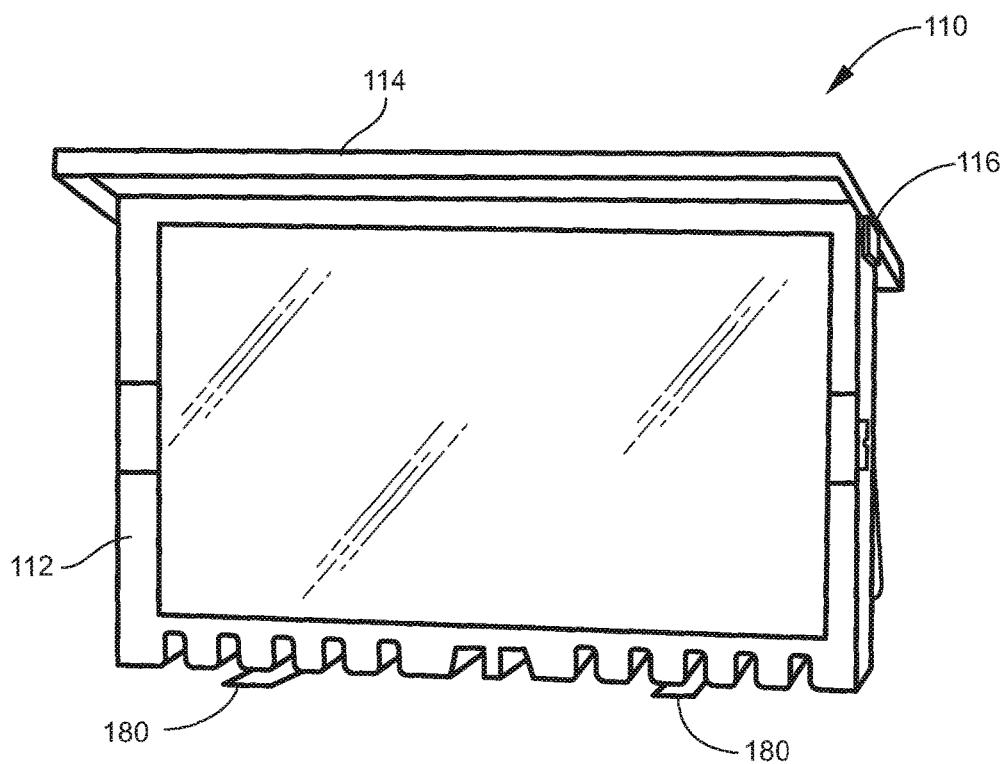
FIG. 14 is a front perspective view of another alternative embodiment of the present invention.

As illustrated in FIG. 13, the edges of the television are disposed adjacent each side frame 42 and are designed to engaged and retain the television. The first bar 44 and second bar 46 are threaded, and the first bar 44 protrudes through the holes in the upper portion of both side frames 42. The second bar 46 protrudes through the holes in the lower portion of both side frames 42. The entire first bar 44 and second bar 46 may be threaded. Alternatively, the portion in close proximity to the holes is threaded for receiving a thumbscrew 50. A thumbscrew 50, such as that illustrated in FIGS. 13 and 14, is disposed on each end of the bars (44, 46), and when rotated, the thumbscrew 50 translates along the threaded portion of the bar when rotated in the clockwise and counterclockwise direction.

The thumbscrew 50 is designed to apply a pressure on the side frame 42. As the thumbscrew 50 is rotated in the clockwise direction, the thumbscrew 50 translates towards the center of the first bar 44 and second bar 46 and presses upon the side frame 42 that exerts a pressure on the television. As the thumbscrew 50 is rotated counterclockwise, the thumbscrew 50 translates towards the end of the first bar 44 and second bar 46, releasing the pressure on the side frame 42. The retention device allows various size televisions to be inserted and retained within the device 10. The side frames 42 are adjustable along each bar (44, 46) for allowing the side frames 42 to accommodate various size televisions. The thumbscrews 50 are allowed to be positioned in close proximity to the side frames 42, and the thumbscrews 50 assert pressure on the side frames 42, resulting in the side frames 42 asserting pressure on the television.

A television is selectively secured within the top portion 12 through the use of the side frames 42 found on each side of the television for securing and retaining the television within the top portion 12.

Figure 17:
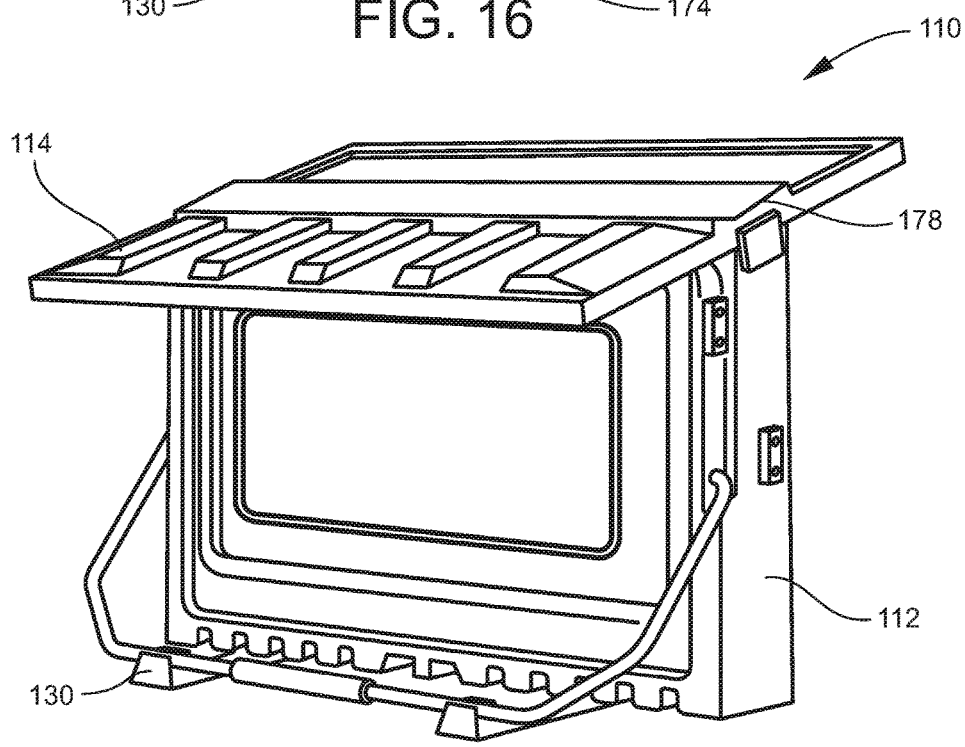
FIG. 17 is another back perspective view of another alternative embodiment of the present invention.
Figure 18:
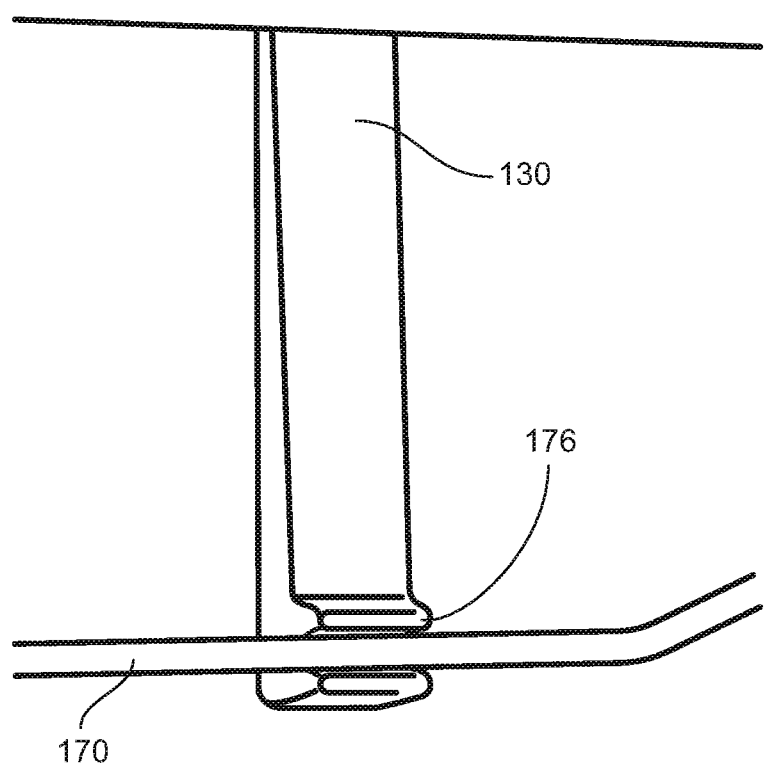
FIG. 18 is a view of the retention slot of the alternative embodiment of the present invention.
Figure 19:
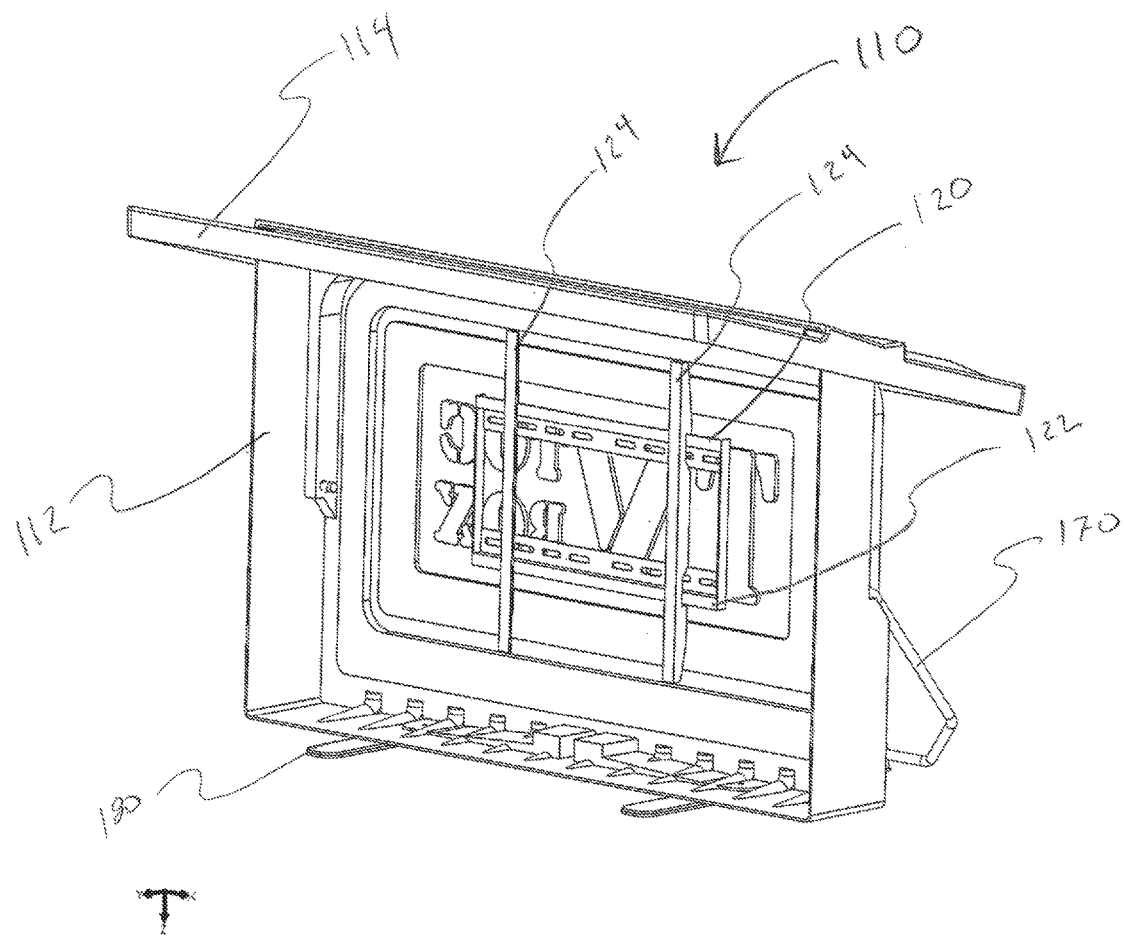
FIG. 19 is a front perspective view of the alternative embodiment of the present invention.

In another alternative embodiment, a carrying device 110 is illustrated in FIGS. 14-19. The carrying device has a top portion 112 and a bottom portion 114. A locking device 116 selectively secures that top portion 112 and the bottom portion 114 together. The top portion 112 includes a base portion, a first end, a second end, and two sides A television is retained within the carrying device 110. Preferably, the television is housed within the base portion of the top portion 112 and within the first end, second end, and two sides of the top portion 112. The television is retained within the top portion 112 by a retention device, as shown in FIG. 19. The retention device consists of a first positioning bar 120 and a second positioning bar 122. At least one slot is disposed along the length of the first positioning bar 120 and the second positioning bar 122. At least one connecting bar 124 is either selectively secured or engaged to the first positioning bar 120 and the second positioning bar 122. The at least one connecting bar 124 has a first end and a second end, wherein the first end is selectively secured or engaged to the first positioning bar 120 and the second end is selectively secured or engaged to the second positioning bar 122. The television is releasably secured to the retention device.

The exterior side of the top portion 112 contains a pivotally connected support device 170. The support device 170 has a first position and a second position and may be composed of metal, plastic or the like. In the first position, the support device 170 is adjacent the exterior side of the top portion 112. The exterior side of the top portion contains a channel 172 on the top portion for receiving the support device 170 within the channel 172. As illustrated, the channel 172 is disposed on either side of the top portion 112 for receiving the support device 170 within the channel 172 in the first position. Preferably the channel 172 is arcuate shaped and disposed on either side of the exterior back portion of the top portion 112. In the second position, the support device 170 extends outward from the exterior side of the top portion 112 for supporting the top portion 112 in the vertical position. The support device 170 may also include a frictional surface 174, such as a foam pad that encompasses a portion of the support device 170 for creating a frictional interaction between the support device 170 and the surface adjacent the support device 170.

Figure 15:
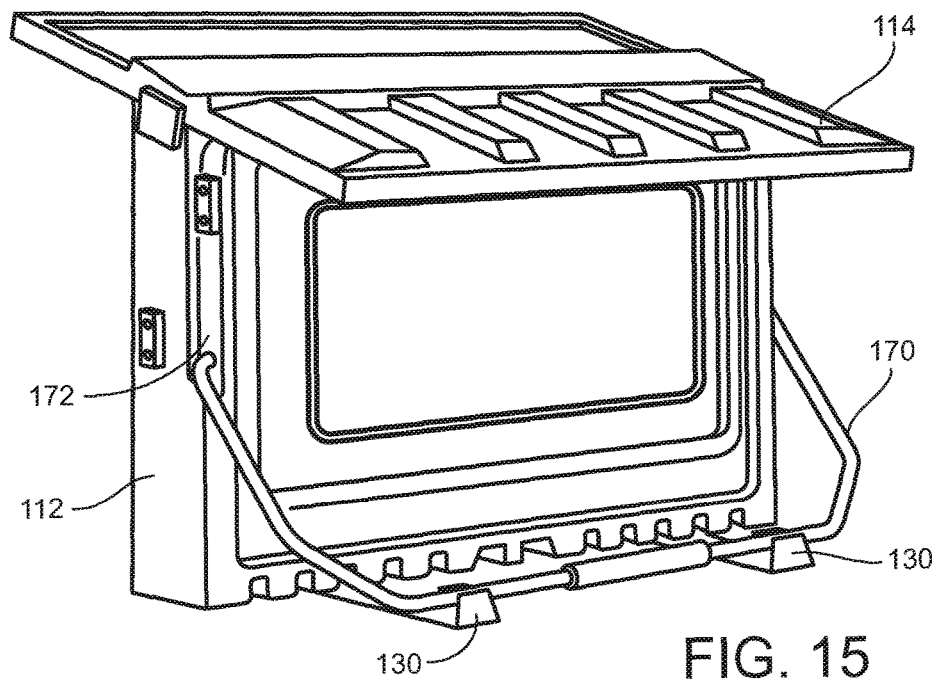
FIG. 15 is a back perspective view of another alternative embodiment of the present invention.
Figure 16:
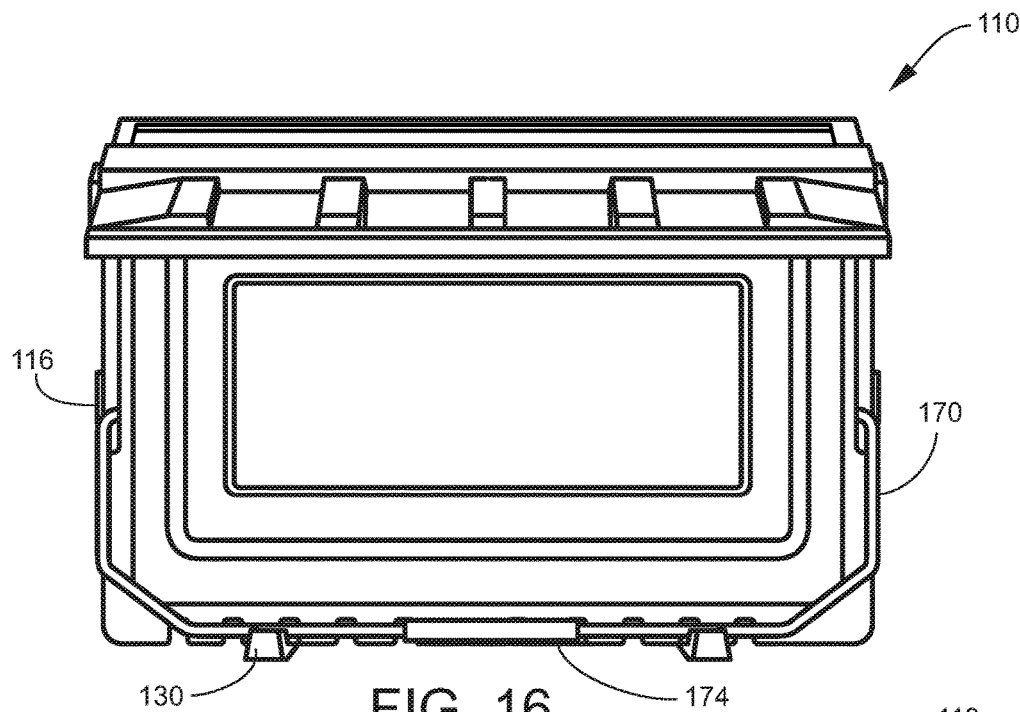
FIG. 16 is a back view of another alternative embodiment of the present invention.

At least one brace 130 is rotationally engaged to the second end of the top portion 112. A top view of the brace 130 is illustrated in FIG. 18. The brace 130 contains a track 176 for receiving the support device 170. As illustrated in FIGS. 15, 16, and 17, the carrying device 110 contains two braces 130 that are spaced-apart, on either side of the second end of the top portion 112.

The bottom portion 114 may be removed from the top portion 112 and placed adjacent the first end of the top portion 112. As shown in FIG. 17, the bottom portion 114 contains a centrally located trough 178. The trough 178 contains a cavity on the interior side of the top portion 112 for receiving the second end of the top portion 112 for forming a top or a sun shield for the carrying device 110.

At least one support foot 180 may be disposed on the second end of the top portion 112 for providing added stability and support to the carrying device 110. As illustrated in FIG. 14, two support feet 180 are positioned on the second end of the top portion 112 and are preferably rotationally engaged to the top portion 112.

Although the present invention has been illustrated and described herein with reference to preferred embodiments and specific examples thereof, it will be readily apparent to those of ordinary skill in the art that other embodiments and examples may perform similar functions and/or achieve like results. All such equivalent embodiments and examples are within the spirit and scope of the present invention and are intended to be covered by the following claims.

What is claimed is:

1. A television protection and carrying device, comprising:
    a top portion with a base portion, a first end wall, a second end wall, and two side walls, the walls extending upwardly from the base portion to form a containment space for receiving an electronic device;
    a bottom portion with a first end wall, a second end wall, two side walls, and a base portion, the walls all extending upwardly from the base portion;
    the bottom and top portion being capable of taking on a carrying case configuration in which the base portion of the top portion is parallel to the base portion of the bottom portion;
    the bottom portion and the top portion being capable of taking on a stand configuration in which the first end wall of the top portion is received within the base portion of the bottom portion, such that the base portion of the bottom portion is perpendicular relative to the base portion of the top portion, permitting viewing of an electronic device in the top portion when in the stand configuration; and
    a support device engaged to the bottom portion for providing support and stability in the vertical direction when the device is in the stand configuration; and the bottom portion forming a top or a sun shield for the carrying device in the stand configuration.

2. The television protection and carrying device of claim 1, further comprising a lock for selectively securing the top portion to the bottom portion.

3. The television protection and carrying device of claim 1, wherein the electronic device is a television.

4. The television protection and carrying device of claim 1, further comprising a strap for carrying the device.

5. The television protection and carrying device of claim 1, further comprising a brace positioned on the top portion for receiving a portion of the support device.

6. The television protection and carrying device of claim 1, further comprising a foam pad on the support device.

7. A television protection and carrying device, comprising:
    a top portion with a base portion, a trough disposed within the base portion, a first end wall, a second end wall, and two side walls, the walls extending upwardly from the base portion to form a containment space for receiving an electronic device;
    a bottom portion with a first end wall, a second end wall, two side walls, and a base portion, the walls all extending upwardly from the base portion;
    the bottom portion and top portion being capable of taking on a carrying case configuration in which the base portion of the bottom portion is parallel to the base portion of the top portion;
    the bottom portion and the top portion being capable of taking on a stand configuration in which the first end wall of the top portion is received within the trough of the base portion of the bottom portion, such that the base portion of the top portion is perpendicular relative to the base portion of the bottom portion, permitting viewing of an electronic device in the top portion when in the stand configuration; and
    a support device pivotally engaged to the top portion for providing support and stability in the vertical position when the device is in the stand configuration and having a first position and a second position, wherein in the first position the support device is adjacent the top portion and in the second position the support device extends outward from the top portion; and the bottom portion forming a top or a sun shield for the carrying device in the stand configuration.

8. The television protection and carrying device of claim 7, further comprising a lock disposed on the top portion for securing the top portion to the bottom portion.

9. The television protection and carrying device of claim 7, further comprising a strap engaged to the device.

10. The television protection and carrying device of claim 7, further comprising a receptacle disposed within each side of the bottom portion for receiving the second end of the top portion for selectively securing the top portion to the bottom portion.

11. The television protection and carrying device of claim 7, further comprising at least one support foot.

12. The television protection and carrying device of claim 10, further comprising a pair of support feet.

13. A television protection and carrying device, comprising:
   a top portion with a base portion, a first end wall, a second end wall, and two side walls, the walls extending upwardly from the base portion to form a containment space for receiving an electronic device;
   a bottom portion with a first end wall, a second end wall, two side walls, and a base portion, the walls all extending upwardly from the base portion;
   the bottom portion and top portion being capable of taking on a carrying case configuration in which the base portion of the top portion is parallel to the base of the bottom portion;
   the bottom portion and the top portion being capable of taking on a stand configuration in which the first end wall of the top portion is received within the base portion of the bottom portion, such that the base portion of the top portion is perpendicular relative to the base portion of the bottom portion, permitting viewing of an electronic device in the top portion when in the stand configuration;
   a stand device pivotally engaged to the top portion for providing support and stability when the device is in the stand configuration; and
   at least one brace is rotationally engaged to the second end wall of the top portion having a track for receiving the support device; and the bottom portion forming a top or a sun shield for the carrying device in the stand configuration.

14. The television protection and carrying device of claim 13, further comprising a lock disposed on the top portion for securing the top portion to the bottom portion.

15. The television protection and carrying device of claim 13, further comprising a channel disposed on the top portion for receiving the support device.

16. The television protection and carrying device of claim 13, further comprising a first locking mechanism on the top portion and a second locking mechanism on the bottom portion, wherein the first locking mechanism and second locking mechanism are selectively secured to one another.

17. The television protection and carrying device of claim 13, wherein the retention device comprises a first positioning bar and the second positioning bar engaged to the top portion and at least one connecting bar spanning between the first positioning bar and the second positioning bar.

* * * * *

UNITED STATES PATENT AND TRADEMARK OFFICE
CERTIFICATE OF CORRECTION

PATENT NO. : 10,051,229 B2  
APPLICATION NO. : 15/383663  
DATED : August 14, 2018  
INVENTOR(S) : David Theron Pickens Page 1 of 1

It is certified that error appears in the above-identified patent and that said Letters Patent is hereby corrected as shown below:

On the Title Page

Column 1, item (63) Related U.S. Application Data:
Change "Continuation-in-part of application No. 15/062,739, filed on Mar. 7, 2016, now Pat. No. 9,854,197" to This application is a Continuation-in-part of application No. 15/062,739, filed on Mar. 7, 2016, now Pat. No. 9,854,197.

Column 1, item (60) Related U.S. Application Data:
Change " Provisional application No. 62/130,933, filed on Mar. 10, 2015" to This application claims benefit of Provisional application No. 62/130,933, filed on Mar. 10, 2015.

Signed and Sealed this
Twenty-third Day of October, 2018

Andrei Iancu
*Director of the United States Patent and Trademark Office*